United States Patent [19]

Isaka et al.

[11] Patent Number: 5,864,406
[45] Date of Patent: Jan. 26, 1999

[54] METHOD AND APPARATUS FOR FORMING HALFTONE IMAGES ON ORGANIC-SILVER-SALT-BASED PRINTING PLATES

[75] Inventors: Kazuo Isaka, Tokyo; Toshiyuki Mizuno; Kazuo Minoura, both of Yokohama; Yoshinobu Shiraiwa, Machida, all of Japan

[73] Assignee: Canon Kabushiki Kaisha, Tokyo, Japan

[21] Appl. No.: 796,393

[22] Filed: Nov. 22, 1991

[30] Foreign Application Priority Data

| Nov. 22, 1990 | [JP] | Japan | 2-319507 |
| Nov. 22, 1990 | [JP] | Japan | 2-319508 |
| May 31, 1991 | [JP] | Japan | 3-155933 |
| Oct. 17, 1991 | [JP] | Japan | 3-269422 |

[51] Int. Cl.⁶ ............................. H04N 1/40; H04N 1/46; B41J 2/385
[52] U.S. Cl. ........................ 358/298; 358/457; 358/536; 347/131
[58] Field of Search ................... 358/298, 296, 358/456, 457, 461, 534, 535, 536; 346/108, 160; 347/129, 131, 224, 225

[56] References Cited

U.S. PATENT DOCUMENTS

| 3,197,558 | 7/1965 | Ernst | 178/6.6 |
| 3,635,719 | 1/1972 | Ohkubo et al. | 96/114.1 |
| 3,922,484 | 11/1975 | Keller | 178/6 |
| 4,123,274 | 10/1978 | Knight et al. | 96/66 T |
| 4,149,183 | 4/1979 | Pellar et al. | 358/75 |
| 4,220,709 | 9/1980 | deMauriac | 430/353 |
| 4,547,811 | 10/1985 | Ochi et al. | 358/280 |
| 4,577,218 | 3/1986 | Kurata | 358/75 |
| 4,595,956 | 6/1986 | Kawamura et al. | 358/283 |
| 4,680,645 | 7/1987 | Dispoto et al. | 358/298 |
| 4,698,778 | 10/1987 | Ito et al. | 364/518 |
| 4,709,250 | 11/1987 | Takeuchi | 346/160 |

(List continued on next page.)

FOREIGN PATENT DOCUMENTS

| 337427 | 10/1989 | European Pat. Off. . | |
| 363146 | 4/1990 | European Pat. Off. | H04N 1/46 |
| 559471 | 9/1993 | European Pat. Off. | H04N 1/46 |
| 596505 | 5/1994 | European Pat. Off. | H04N 1/46 |
| 2508747 | 12/1982 | France . | |
| 4139174 | 6/1992 | Germany | H04N 1/46 |
| 44-30270 | 12/1969 | Japan . | |
| 45-18416 | 6/1970 | Japan . | |
| 58-29677 | 2/1983 | Japan . | |
| 58-118638 | 7/1983 | Japan . | |
| 58-118639 | 7/1983 | Japan . | |

OTHER PUBLICATIONS

Shashin Kogyo, Imaging, Jan. 20, 1988, p. 35.
Journal of Denshi Sashin Gakkai, vol. 25, No. 1, p. 31, 1986.
Shashin Kogaku No Kiso–Non–silver salt edition, p. 250.
Kwan Y. Wong, et al. "Adaptive Swicthing of Dispersed and Clustered Halfone Patterns for Bi–Level Image Rendition", SID 77 Digest, 124–125.
J.C. Stoffel, et al., "A Survey of Electronic Techniques For Pictorial Image Reproduction", IEEE Transactions on COmmunications, vol. COM–29, No. 12, Dec. 1981, pp. 1898–1925.

Primary Examiner—Peter S. Wong
Assistant Examiner—Gregory J. Toatley, Jr.
Attorney, Agent, or Firm—Fitzpatrick, Cella, Harper & Scinto

[57] ABSTRACT

Method and apparatus for forming halftone images which enables image recording on a process film without reducing the size of the recording area beyond that which is necessary. The method and apparatus is preferred particularly in the preparation of a master printing plate such as a printing plate which includes a photosensitive member having an organic silver salt. According to the method and apparatus, an image recording apparatus propagates error data when there exists a restriction on the minimum recording size and thereby preserves halftone concentration and reproduces intermediate gradation of darkness with stability.

22 Claims, 14 Drawing Sheets

U.S. PATENT DOCUMENTS

| | | | |
|---|---|---|---|
| 4,800,442 | 1/1989 | Riseman et al. | 358/280 |
| 4,847,695 | 7/1989 | Arai | 358/298 X |
| 4,859,568 | 8/1989 | Takeda et al. | 430/269 |
| 4,989,079 | 1/1991 | Ito | 358/80 |
| 5,004,667 | 4/1991 | Arahara et al. | 430/270 |
| 5,073,791 | 12/1991 | Mouri et al. | 355/27 |
| 5,124,802 | 6/1992 | Ito et al. | 358/298 |
| 5,148,287 | 9/1992 | Kemmochi et al. | 358/298 |
| 5,345,320 | 9/1994 | Hirota | 358/518 |

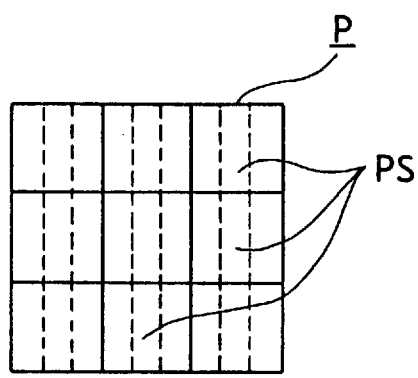
FIG. 7A  FIG. 7B
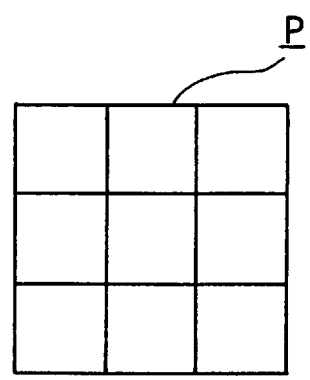
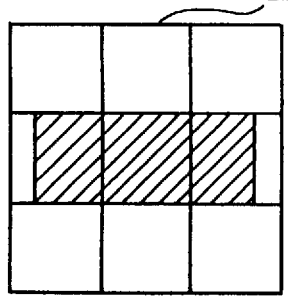
FIG. 7C (PRIOR ART)
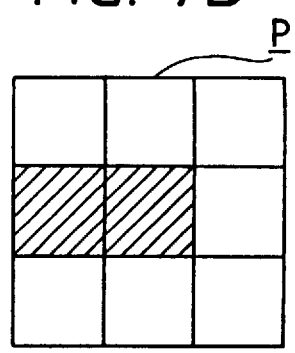
FIG. 7D

| 13 | 5 | 6 | 14 |
|----|----|----|----|
| 12 | 4 | 1 | 7 |
| 11 | 3 | 2 | 8 |
| 16 | 10 | 9 | 15 |

| 64 | 59 | 33 | 34 | 35 | 36 | 55 | 61 |
|----|----|----|----|----|----|----|----|
| 54 | 49 | 17 | 18 | 19 | 20 | 50 | 60 |
| 48 | 32 | 16 | 5 | 6 | 7 | 21 | 37 |
| 47 | 31 | 15 | 4 | 1 | 8 | 22 | 38 |
| 46 | 30 | 14 | 3 | 2 | 9 | 23 | 39 |
| 45 | 29 | 13 | 12 | 11 | 10 | 24 | 40 |
| 58 | 52 | 28 | 27 | 26 | 25 | 51 | 56 |
| 63 | 56 | 44 | 43 | 42 | 41 | 57 | 62 |

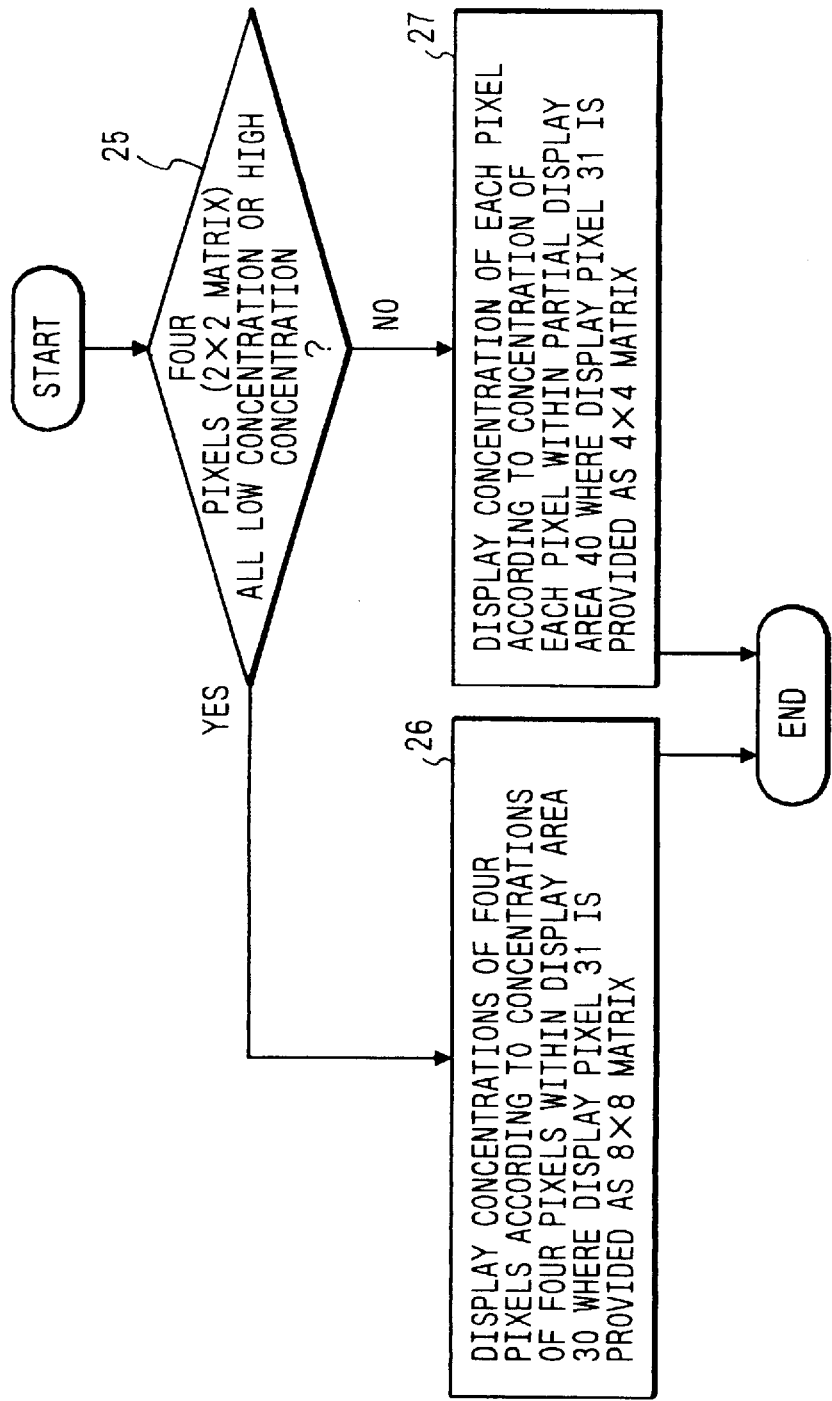

FIG. 16A
(PRIOR ART)

| 13 | 5 | 6 | 14 |
|----|---|---|----|
| 12 | 4 | 1 | 7 |
| 11 | 3 | 2 | 8 |
| 16 | 10 | 9 | 15 |

| 13 | 5 | 6 | 14 | 13 | 5 | 6 | 14 |
|----|---|---|----|----|---|---|----|
| 12 | 4 | 1 | 7 | 12 | 4 | 1 | 7 |
| 11 | 3 | 2 | 8 | 11 | 3 | 2 | 8 |
| 16 | 10 | 9 | 15 | 16 | 10 | 9 | 15 |
| 13 | 5 | 6 | 14 | 13 | 5 | 6 | 14 |
| 12 | 4 | 1 | 7 | 12 | 4 | 1 | 7 |
| 11 | 3 | 2 | 8 | 11 | 3 | 2 | 8 |
| 16 | 10 | 9 | 15 | 16 | 10 | 9 | 15 |

31

40          40

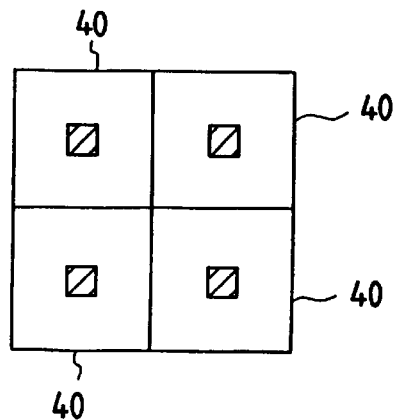
FIG. 17A
(PRIOR ART)
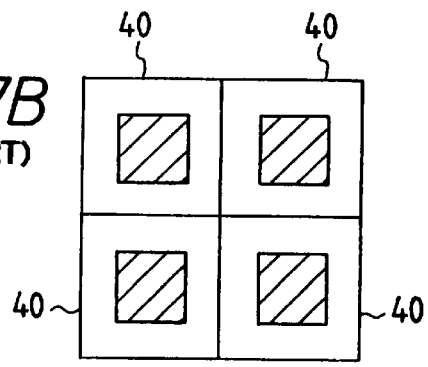
FIG. 17B
(PRIOR ART)
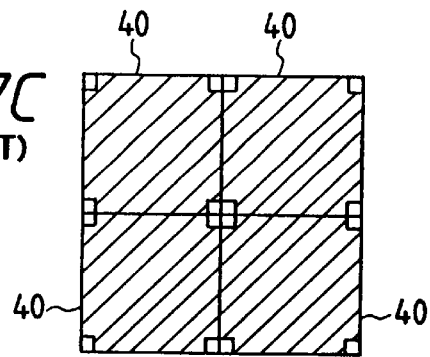
FIG. 17C
(PRIOR ART)
FIG. 18
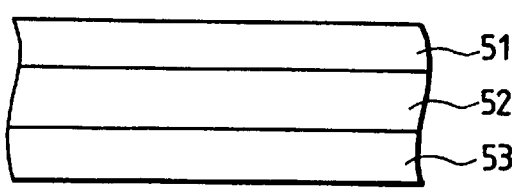

METHOD AND APPARATUS FOR FORMING HALFTONE IMAGES ON ORGANIC-SILVER-SALT-BASED PRINTING PLATES

BACKGROUND OF THE INVENTION

1. Field of the Invention

The present invention relates to the image forming method and apparatus wherein the control of the concentration of the output of image forming apparatus particularly laser beam printer and the like can be executed with stability.

2. Related Background Art

In recent years, non-impact printers are drawing attention because of their advantages, such as high print quality with low noise, over impact printers. Among other types of non-impact printers, laser beam printers, which utilize electronic photography and photography techniques, have become popular because such printers record with high precision. The semiconductor laser used as the light source in such printers can have its gradation easily varied by pulse width modulation (PWM), whereby high quality halftone images can be formed.

However, when high speed modulation is conducted, the semiconductor laser is subject to output fluctuations caused by delayed rising of laser output or temperature, and if short (quick) pulse modulation is conducted, the laser output lacks stability. Further in the gradient expression by PWM method, when pulse interval is short, beam shape generally has Gaussian distribution. Consequently, as shown at "a" in FIG. 2, when the laser power receives substantial brightness modulation, fluctuation of laser output produces variation of concentration, making the image reproduction unstable.

With the plate exposure apparatus for offset printing, it is necessary to do binary control such as control of presence or non-presence of resist layer and if short pulse interval as stated above exists, binarization is difficult and it is difficult to obtain an appropriate binary image.

Furthermore, reduction of the beam spot diameter which is presently 20 to 30$\mu$ presents serious problems such as generation of nonuniformity of beam shape caused by aberration, shallower depth of focus which necessitates stricter accuracy of apparatus, more complicated optical system, etc.

Another frequently used method as the method to reproduce gradation of darkness of the image is the method known as the "dither method" and "concentration pattern method". Generally speaking, the dither method is used when the image of high resolution such as those of high resolution printer or copier are handled while the concentration pattern method is used more frequently when input pixel number is relatively few as in the case of recording of TV input image.

According to dither method or concentration pattern method, when the concentration of input image signal is constant for a wide range, dot pattern which is the aggregate of blackened display pixels repeats the same pattern. In regard to the resolution, dither method is superior but in regard to gradation, both are equivalent. One of the important factors for gradation is the composition of threshold matrix which is roughly classified into the following two kinds.

(1) Starting with the center of the display area as the nucleus, pixels turn black one after another to form the dot (dot concentration type).

(2) Dot is formed by the pixels blackened one after another in such a way that the spatial frequency of dot becomes as high as possible in the display area (dot dispersion type).

When image quality is evaluated by using these two kinds of matrix, if the display pixels are arranged at high density in matrix form in the display area corresponding to one pixel of image signal, at the blackening of small number (particularly one) of display pixel in low concentration time, protrusion of blackening to the surrounding area becomes non-negligible because individual display pixel is small. Therefore, in the case of dot dispersion type, there is the drawback that the blackened area increases due to protrusion of blackened part to the surrounding area of dot. In this respect dot concentration type is superior. However even in the case of dot concentration type, gradation and resolution are restricted by the matrix composition and hence it is important to have both types co-exist. To solve this problem, for example an IH method ("improved halftone") has been proposed. (Shashin Kogyo, Imaging Jan. 20, 1988, P35/ Journal of Denshi Shashin Gakkai, Vol. 25 No. 1 P31, 1986.)

Next is explained hereinbelow the composition of threshold matrix in the display area corresponding to image signal.

FIG. 16A is the schematic diagram to show the composition of threshold matrix in the partial display area corresponding to one pixel of image signal and FIG. 16B is the schematic diagram to show 4 partial display areas corresponding to 4 pixels of image signal. Partial display area 40 is composed of 16 display pixels 31, forming 4×4 matrix and number of display pixels blackening one after another according to the order of the numbers described in the matrix, corresponding to the concentration of one pixel of image signal and the aggregate of blackened display pixels form the dot. FIGS. 17A to 17C are the drawings to show the state that blackened display pixels form the dot and FIG. 17A indicates the state of low concentration, FIG. 17B shows intermediate concentration and FIG. 17C shows the high concentration respectively of 4 pixels of image signal.

According to the aforesaid conventional method of image display, such problems exist that each dot displaying the low concentration pixel of image signal becomes extremely small and when said image display method is applied to offset printing, etc., uniform application of ink is not obtained or when it is applied to the plate or block copy, when the surface protective layer is peeled following exposure, the dot comes off together. When the high concentration (slightly lower than complete blackness) of image signal is displayed, ink is apt to stick to the gap between dots or the gap between dots is filled up due to inferior peeling of surface protective layer.

As stated above, especially at the preparation of the original plate of offset printing, it is known that problems exist as to the reproducibility of fine area.

With the electrophotographic laser beam printer, U.S. Pat. No. 4,800,442 (FIG. 7C) discloses the technology to define the minimum pulse width and maximum pulse width of laser but it makes no consideration of the preparation of original printing plate. Nothing is mentioned either as to the handling of input data of less than minimum pulse width or more than maximum pulse width and no measures to solve these problems are indicated.

SUMMARY OF THE INVENTION

The objective of the present invention is to provide the method and the apparatus for formation of image which solves the aforesaid problems.

Another objective of the present invention is to provide the method and the apparatus for forming image with excellent reproducibility at the low concentration part and high concentration part of the image signal.

A mode of the present invention is to provide the method and equipment for forming image which can reproduce, with stability, the part of intermediate gradation by setting the interval between uncontinuously adjacent recording pulses at the length longer than the reference width or at the length shorter than the predetermined reference width which is different from said reference width.

Another mode of the present invention is to provide the method and apparatus for forming the image for process film which can for example, reproduce, with stability, the part of intermediate gradation of laser beam printer output by the construction which controls in such a manner that recording pulse width is always longer than the reference width.

Still another mode of the present invention enables that at the processing of image by digital signals, image recording in the matrix which forms the screen is excused by pulse width control signal which further divides the line elements composing the matrix and high gradation is reproduced without reducing the recording beam spot diameter beyond necessity.

Still another mode of the present invention is to provide the method of preparation of original printing plate which controls the minimum pulse width at the degree more than enough to enable the formation of dot on the original printing plate at the modulation of pulse width of input image data.

Still another mode of the present invention is to provide the image processing method wherein the minimum diameter of pulse width is restricted at the predetermined value and the input data of the pixel in short of such minimum value are recorded in combination with the image data of the adjacent pixel.

Still another mode of the present invention is to provide the image processing method wherein the characteristics of input image data are discriminated and according to the result of such discrimination, processing is made by selecting dot aggregation type or dot dispersion type threshold matrix.

According to the image display method of a mode of the present invention, when concentrations of n×n'(n, n'=2, 3, 4, ... 1, 1') pixels of image signal forming n×n' matrix are all low (n·m)×(n'·m') display pixels form (n·m)×(n'·m') matrix and each display pixel in the display area is blackened to the gradation corresponding to the concentration of n×n' pixels of image signal according to the dot concentration type threshold matrix.

Image display equipment of another mode of the present invention is provided with the concentration scale discrimination means which tells whether there exists concentration gradation between n×n' pixels of said image signal forming n×n' matrix and the matrix selection means which selects partial display area as the matrix to display the darkness of each pixel when discrimination is made by concentration scale discrimination means that there exists concentration gradation between n×n' pixels, and selects display area as the matrix to display darkness of n×n' pixels when concentration gradation discrimination means judges that there exists no concentration gradation between n×n' pixels and n×n' pixels are low concentration or high concentration.

By the construction as aforesaid, one pixel of input image signal corresponds to the partial display area wherein m×m' display pixels form m×m' matrix and n×n' pixels of input image signal forming n×n' matrix correspond to the display area wherein (n·m)×(n'·m') display pixels form (n·m)×(n'·m') matrix.

Hitherto, concentration of one pixel of input image signal has been displayed by blackening the display pixel in the partial display area from the display pixel at the center according to the threshold matrix of dot concentration type but according to the present invention, when n×n' pixels forming n×n' matrix of the image signal are all low concentration or high concentration, display pixel in the display area where (n·m)×(n'·m') display pixels form (n·m)×(n'·m') matrix is blackened from the display pixel at the center according to the dot aggregation type threshold matrix and hence it is possible to enlarge individual dot which is the aggregation of blackened display pixels when image signal is of low concentration and when the image signal is of high concentration, the space between the adjacent dots may be made larger.

Other objectives of the present invention shall be evident from the drawings and the detailed explanations given hereinbelow.

BRIEF DESCRIPTION OF THE DRAWINGS

FIGS. 7A to 7D are the explanation drawings of recording method;

FIGS. 14A to 14C are the drawings to show the blackening of display pixel and resultant formation of dot, wherein FIG. 14A shows the state of low concentration, 14B shows intermediate concentration and FIG. 14C shows the state of high concentration;

FIG. 15 is the flow chart of the performance of image display method of the present invention;

FIG. 16A is the schematic diagram to show the composition of threshold matrix within the partial display area corresponding to one pixel of image signal;

FIG. 16B is the type drawing to show 4 partial display areas corresponding respectively to 4 pixels of image signal;

FIGS. 17A to 17C are the drawings to show the state of blackening of display pixel and resultant formation of dot in the conventional example wherein FIG. 17A shows the state of low concentration, FIG. 17B shows medium concentration and FIG. 17C shows high concentration of 4 pixels of the image signal; and FIG. 18 is the sectional view of the photosensitive printing plate to which the present invention may be applied.

DESCRIPTION OF THE PREFERRED EMBODIMENTS

[Embodiment 1]

According to the outline of the image forming apparatus of the present embodiment, to solve the above problems, the signal width C obtained when pixel signal A continues to pixel signal B of the pixel adjacent and connectable to pixel signal A is compared with the predetermined reference value D, pixel signal A is made to be output pixel signal E only when condition C>D is satisfied, PWM signal is generated corresponding to the aforesaid output pixel signal E and thereby ON-OFF control of light beam is exercised.

The pixel signal input mentioned above may contain the error signal coming from the preceding pixel.

Preferably a mode of the predetermined reference value corresponds to the pixel signal value which enables the light beam of light beam generating means to produce substantially stable ON state.

Hereunder is explained the substantially stable ON state of light beam.

Figure 2:
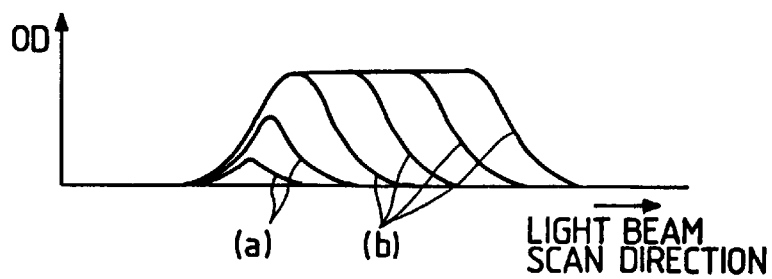
FIG. 2 is the diagram to show the relation between beam-on time and concentration.

In FIG. 2, axis of abscissa indicates the scan direction of light beam and axis of ordinate indicates optical concentration over the photosensitive member. When pulse width of light beam is short, the state becomes as shown by (a) and it is possible to indicate concentration gradient by such concentration is apt to become unstable. When plus width is longer than the predetermined reference value, the state becomes as shown by (b) and it indicates area gradation and instability of concentration is eliminated.

Figure 3A:
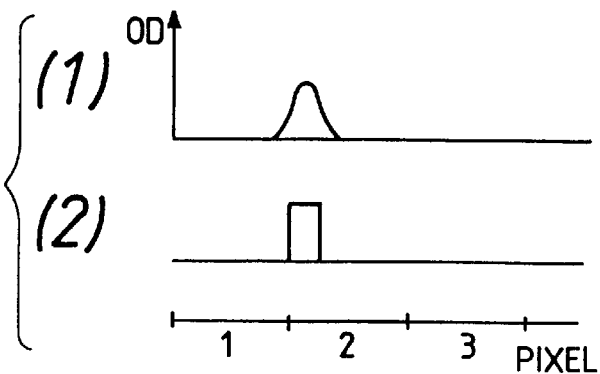
FIGS. 3A to 3C are the diagrams to show the relation between pixel data and concentration.
Figure 3B:
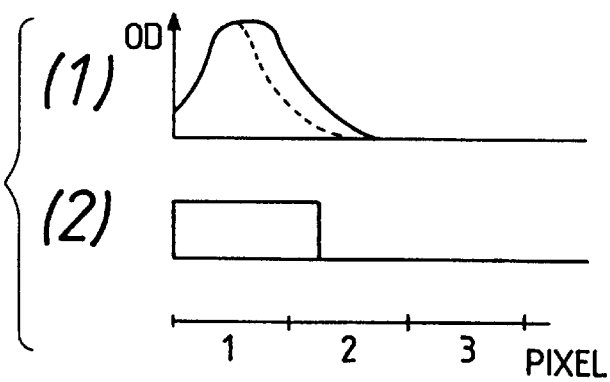
Figure 3C:
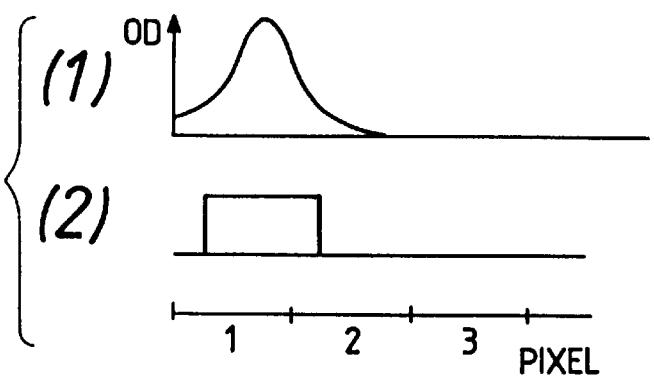

FIGS. 3A to 3C show an example of dot recorded in accordance with the present embodiment. For FIGS. 3A, 3B and 3C respectively, (1) indicates the distribution of optical concentration similar to FIG. 2. (2) indicates the pulse impressed on the laser. FIG. 3A shows the case when 25% duty pulse is impressed only on the second pixel as shown in (2). Optical concentration distribution becomes intermediate concentration and it is unstable as shown in (1).

Whereas in FIG. 3B, the 2nd pixel is impressed with 25% duty as in the case of FIG. 3A but it is impressed in continuation to the impression of 100% duty pulse on the 1st pixel, hence distribution of optical concentration is stable as shown in (1).

In FIG. 3C, the 2nd pixel is impressed with 25% duty pulse as in the case of FIG. 3A or 3B but the 1st pixel is impressed with 75% duty pulse at its latter part and the pulse is impressed in continuation thereto, hence distribution of optical concentration is stable.

Figure 1:
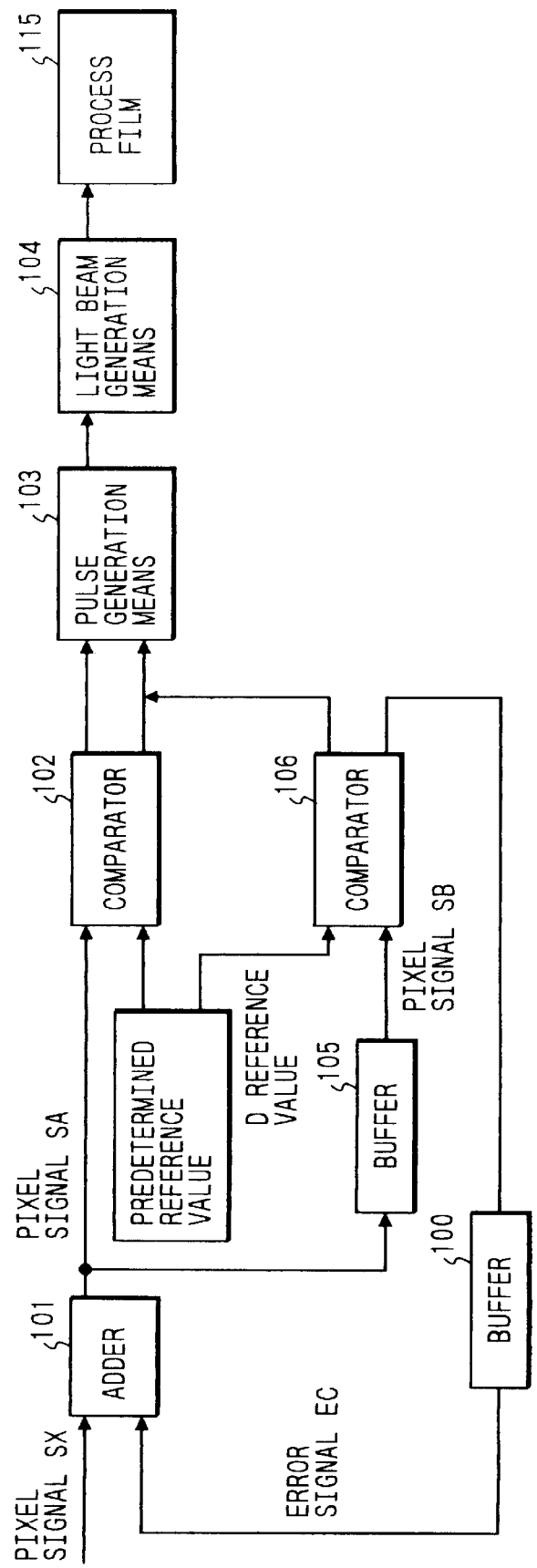
FIG. 1 is the circuit block diagram of the first embodiment.

Now therefore, the embodiment is explained in detail hereunder, in reference to FIG. 1.

Pixel signal SX corresponding to certain pixel is added with the error signal EC of the preceding pixel held in buffer 100 by adder 101 to become the pixel signal SA and such signal is held at buffer 105. Buffer 105 holds the pixel signal SA and transmits the pixel signal SB held hitherto to comparator 106. Pixel signal SA is compared with the predetermined reference value D by comparator 102. Here the predetermined reference value D is 100% duty signal. When pixel signal A is a 100% duty signal, 100% duty laser beam is emitted by pulse generation means 103 and light beam generation means 104.

On the other hand, when pixel signal A is not a 100% duty, pixel signal SB is compared with predetermined reference value D (100%) by comparator 106 and if pixel signal SB is 100% duty signal, pixel signal SA is transmitted to duty signal, pixel signal SA is transmitted to pulse generation means 103 and laser beam of the pulse width corresponding to pixel signal SA is generated by light beam generation means 104.

When pixel signal SB is not of 100% duty, pixel signal SB is transmitted to buffer 100. By such operation, light beam is generated only when pixel signal SA is of 100% duty or of 100% duty by continuation with the preceding pixel signal SB, thus generating a stable output and thereby a stable binarized image is formed on the process film 115.

[Embodiment 2]

Figure 4:
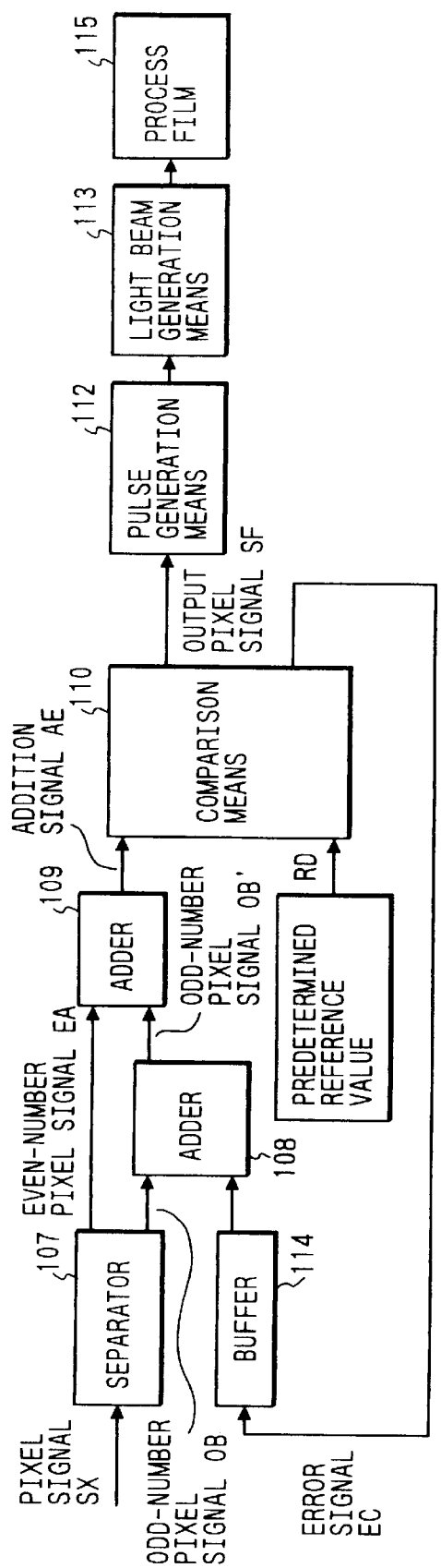
FIG. 4 is the circuit block diagram of embodiment 2.

The second embodiment of the present invention is described hereunder in reference to FIG. 4. Here the odd-number pixel shows the case of PWM where the latter part of the pixel is caused to emit light and even-number pixel shows the case of PWM where the first half of the pixel is caused to emit light.

Image signal SX is separated into even-number pixel and odd-number pixel by separator 107 and even-number pixel signal EA is transmitted to adder 109. Odd-number pixel signal OB is added with error signal EC by adder 108 and at adder 109, it is added with even-number pixel signal EA as odd-number pixel signal OB' and it is transmitted to comparison means 110. Adder output AE is compared with the predetermined standard value RD (for example 100% duty) by comparison means 110 and if AE>RD, the addition signal E is transmitted as it is to pulse generation means 111 and light beam generation means 112 as the odd-number pixel+even-number pixel signal SF and exposed on the process film 115. On the other hand when AE<RD, output pixel signal SF is held once in buffer as error signal EC and then transmitted to adder 108.

Here the example has been described where the pixel signal which provides 100% duty on the process film as predetermined reference value but the invention is not limited thereto but it is possible to select appropriate value according to the beam diameter, beam shape, power, sensitivity of process film, etc.

Explanation has been made hereinabove on the case where image recording is made by laser beam scan but it goes without saying that the present invention may be applied to the process film preparing apparatus which uses LED, LCD, or CRT flying spot printer.

In the aforesaid embodiment, the case of forward error concentration has been described but the present invention is not limited thereto by the error concentration may be discarded or alternatively dispersed to a plurality of surrounding pixels.

[Embodiment 3]

The outline of the image forming apparatus of the present embodiment is that the interval C between the input pixel signal A and the adjacent pixel signal B is compared with the predetermined reference values D and E (D>E) and only when the condition C>D or E>C is satisfied, pixel signal A is made the output pixel signal E and according to the aforesaid output pixel signal E, PWM signal is generated and thereby ON-OFF control of light beam is executed.

Here the pixel signal input may include the error signal coming from the preceding pixel.

Preferably a mode of the present embodiment shall be that the predetermined reference value corresponds to the pixel signal value which realizes substantially stable ON-OFF state of light beam of the light beam generating means.

Hereunder is described the substantially stable ON-OFF state of light beam.

Figure 6:
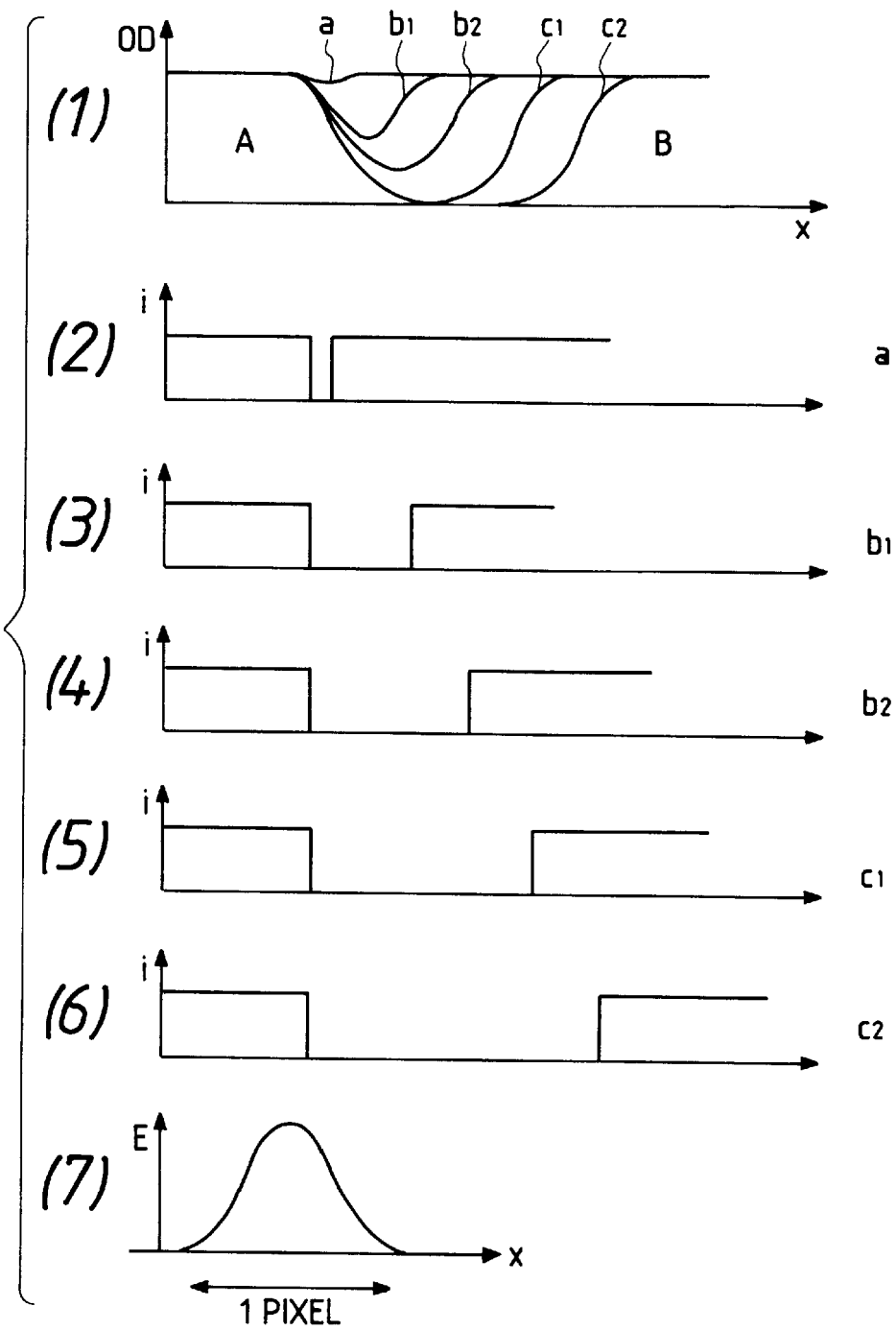
FIG. 6 is the timing chart classified by image signal.

FIG. 6 indicates the light intensity distribution in the still state of the light beam to be scanned.

Numerals (2) to (6) indicate change of laser driving current to be impressed in correspondence to the scanning on the photosensitive member of the laser. Numeral (1) expresses the state of change (a to c) of optical concentration (after visualization treatment) of photosensitive member caused by the change of laser driving current shown in (2) to (6). Respectively a corresponds to (2), b to (3), (b2) to (4), (c1) to (5) and (c2) to (6).

Numeral (2) shows the case where pulse impression is stopped for the period corresponding to roughly 10% of one pixel. In this case, the optical density of the photosensitive member becomes as shown in (1)-a and although some difference in concentration is produced, the difference is not as large as to enable visual discrimination.

Numerals (3) and (4) indicate the case where pulse impression is stopped for the period corresponding roughly to 50% and 80% of one pixel. In this case optical concentration on the photosensitive member indicates totally black concentration state and then totally black state according (1)-b1 and b2.

Numerals (5) and (6) indicate the case where pulse impression is stopped for the period corresponding roughly to 100% and 150% of one pixel. In this case optical concentration on the photosensitive member shows totally black recording state to intermediate gradation concentration state and then totally white recording state and again totally black state according to beam scan as shown in (1)-c1 and c2.

Figure 5:
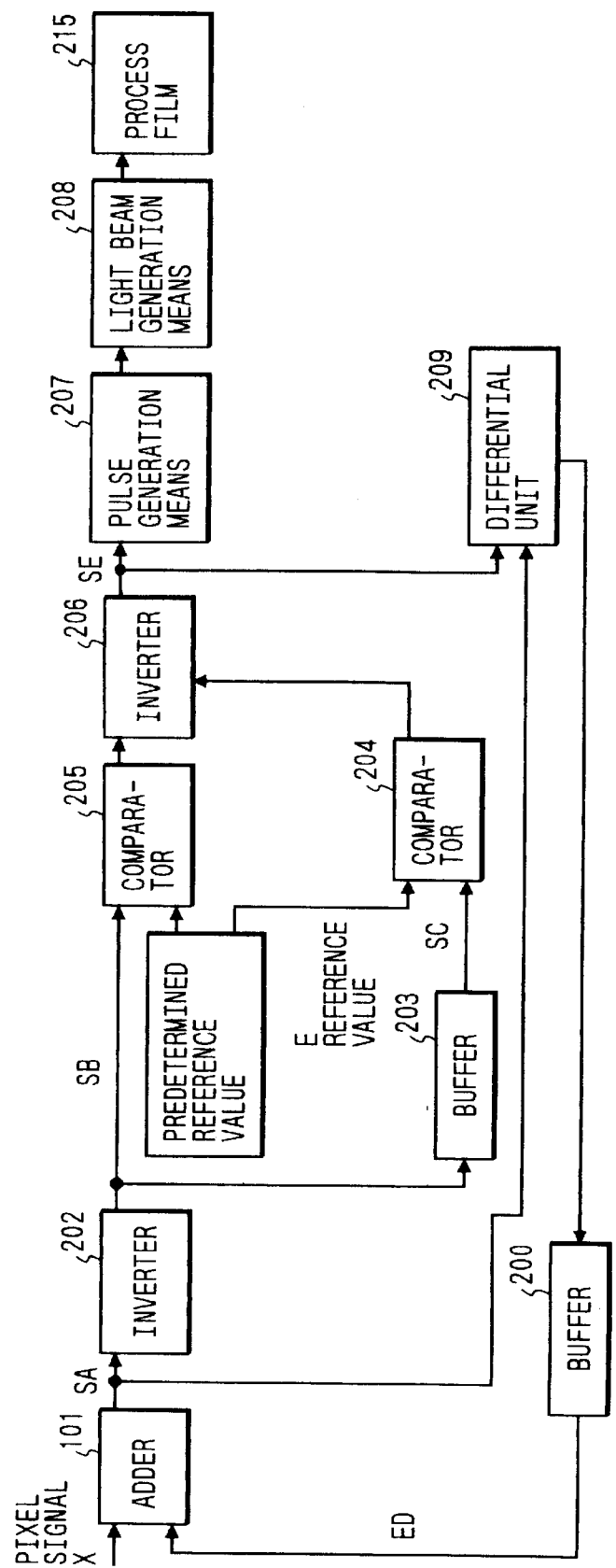
FIG. 5 is the circuit block diagram of the embodiment 2 of the present invention.

Hereunder are described in detail the circuit and its performance of embodiment 2 of the present invention in reference to FIG. 5.

Pixel signal corresponding to a pixel is added with error signal ED of the preceding pixel held in buffer 200 by adder 201 to become pixel signal SA. Pixel signal SA is inverted by inverter 202 to become the inverted pixel signal SB and it is held in the buffer 203.

Buffer 203 holds the inverted pixel signal SB and transmits the inverted pixel signal SC held so far to comparator 204.

Inverted pixel signal SB is compared at comparator 205 with the predetermined reference value E. Here predetermined reference value E is deemed to be 100% duty signal.

If inverted pixel signal SB is a 100% duty signal, laser beam remains unemitted.

On the other hand if inverted pixel signal SB is not a 100% duty signal, it is compared to inverted pixel signal SC and predetermined reference value E (100%) at comparator 104 and if inverted pixel signal SC is 100% duty, inverted pixel signal SB is again inverted by inverter 206 and laser beam with the pulse width corresponding to pixel signal SA is emitted by pulse generation means 107 and light beam generation means 208. Then the beam is irradiated on the process film 215.

The difference between pixel signal A and the pixel signal E which is the actual light emitting signal is detected by differential unit 209 and the difference is transmitted to buffer 200.

By the aforesaid operation, it is possible to generate light beam in such manner that inverted pixel component SB of pixel signal SA becomes 100% or, in continuation with the non-pixel component SC of the preceding pixel signal, it becomes over 100% duty and thus stable output is obtained.

Therefore, on the process film, the image data which satisfy 100% duty are always recorded and thus appropriate binary data are recorded.

Hereinabove is described the example where pixel signal which provides 100% duty on the process film as the predetermined reference value is utilized but the value is not limited thereto but appropriate value may be selected according to the beam diameter, beam shape, power, sensitivity of process film etc.

Description has been made on the case where image recording is conducted by laser beam scan, but it goes without saying that the invention may be applied to other printers such as LED or LCD printer.

In the aforesaid embodiment, description has been made on the case where error concentration is forwarded but such error concentration may be discarded or diffused to a plurality of surrounding pixels.

As the photosensitive member of the present invention, OPc, $\alpha$-Si of the electrophotographic system or silver salt photosensitive material to be mentioned later may be utilized.

Hereinabove, explanation has been made on the example to detect and control pixel signals dot by dot but the method of the present invention may be applied to the method of combination of a plurality of dots for the systems where predetermined gradation is reproduced by a plurality of dots.
[Embodiment 4]

Figures 8, 9:
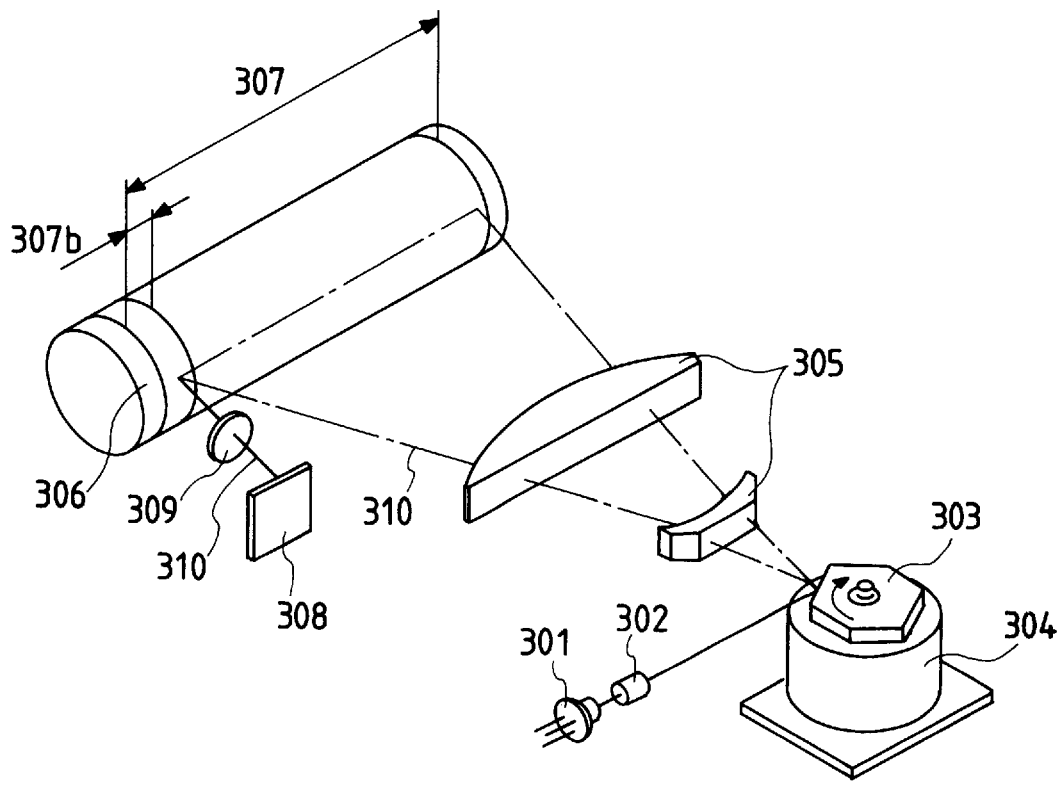
FIG. 8 is the diagonal view of the recording section of the image recording apparatus.
FIG. 9 is the drawing to show the screen threshold matrix data.

FIG. 8 shows an example of the image recording apparatus of embodiment 4 to which the present invention is applied.

In FIG. 8, numeral 301 denotes the light source such as semiconductor laser, numeral 202 denotes the focal position control system including collimator lens, numeral 303 denotes rotary polygon mirror, numeral 304 is the driving motor of polygon mirror 303, numeral 305 is scanning lens system, numeral 306 is the drum to support photosensitive process film and numeral 307 is sheet-formed photosensitive process film.

Here the light source 301 is given PWM (pulse width modulation) by the clock coming from the oscillator not indicated in the drawing.

In FIGS. 7A to 7D, one pixel P is composed of 9 fine pixels PS arranged in 3×3 lines shown by the solid line. Here, fine pixels PS of each line element are recording elements of laser beam (corresponding to recording density) and laser beam scans each line from left to right.

FIG. 7A is the drawing to explain the present embodiment and indicates that the fine pixel PS of each line element can be divided into three by PWM for recording.

FIG. 7B is the drawing to explain the conventional example.

Here, assuming that the original image density is 7/27 (in the matrix, the case where all line elements are in recording state is assumed to be 27/27 and the case where all line elements are in the non-recording state is assumed to be 0/27), the state of image reproduction by the apparatus related to the present embodiment and the state of image reproduction by the conventional apparatus are shown by FIGS. 7C and 7D respectively. FIG. 7C shows the better gradation reproducibility than FIG. 7D.

Hereunder is described the method of PWM recording.

(i) As represented by the (2,) line of FIG. 7C, when the PWM (66%) recording is made at the latter half of line elements for the left end line element, if scan time for line element of the laser beam is assumed to be $t_0$, after delaying for $(1-\frac{2}{3}) t_o$, laser oscillator may be engaged for $2t_o/3$ time.

(ii) For example when PWM (33%) recording is made at the center of the line element for the central line element as in the recording of image density 1/27, after delaying $(1-\frac{2}{3})$ $t_o$ time, laser oscillator may be engaged for $t_0/3$ time, (iii) When PWM (66%) recording is made at the first half of line elements for the right end line element as represented by (2, 3) line of FIG. 7C, laser oscillator may be engaged for $2t_0/3$ time. Or when, for instance, recording concentration of 6/27 is reproduced in lines (2, 1), (2, 2) and (2, 3), laser beam may be emitted for $2t_0/3, t_0, 0/3$ to execute PWM control but if PWM control is conducted by emitting laser beam by $2t_0$ time around the center of (2,2) line, it is always possible to have symmetrical screen and clean screen can be reproduced.

Generation of PWM signal is not limited to the aforesaid method but PWM oscillation may be made integrally in the direction of line by generating chopping wave corresponding to the matrix and changing the threshold.

Generally speaking in the case of offset printing there are cases where disuniformity of concentration easily occurs at the time of printing due to instability of deposition of ink when screen concentration corresponds to low concentration. In such case, it is preferred not to do recording for the concentration corresponding to the time less than the predetermined minimum PWM time (for instance 100% PWM corresponding to one line element in FIG. 7) but to transmit such concentration data to the adjacent matrix, so that stable recording is always executed with the recording time longer than the predetermined minimum PWM time.

There may be also such case where disuniformity of the size and shape of polymerization pattern is easy to occur for both low concentration and high concentration as in the case where image is formed on the silver salt film by laser and using it as the mask, UV-ray exposure is conducted on (the film having) polymerized layer and polymerization pattern is formed by etching and peeling. In such case, it is an effective method that for low concentration, the method same as aforesaid is exercised for the concentration corresponding to less than the predetermined minimum PWM time and for high concentration, when the concentration corresponds to less than the predetermined PWM time where the space to the adjacent recording section is substantially different from 0, the recording is not made but such concentration data are transmitted to the adjacent line element and matrix, thus executing stable recording.

In the image recording using a screen, if the area of the screen is smaller than the predetermined value or the space generating between screens is smaller than the predetermined value, the desired screen area cannot be recorded and reproducibility remarkably deteriorates and preferred recording image is not obtained. The same applies to the embodiment where high gradation and high resolution screen recording using PWM is executed.

However by setting the predetermined minimum pulse width and minimum pulse width space beforehand, screen image recording can be made easily satisfying the aforesaid conditions and thus preferred screen recording image can be obtained. In other words, when the predetermined minimum pulse width and predetermined pulse width space are set beforehand and screen is prepared without executing PWM recording which does not satisfy the preset minimum pulse width and the minimum pulse width space, a high gradation resolution screen recording can be made and even in the area where reproducibility of screen area is remarkably inferior in the screen recording, it is possible to obtain favorable reproducibility and favorable screen recording image. Hereunder shall be described an example to embody the aforesaid descriptions in further detail in reference to the drawings.

FIG. 9 is the screen threshold matrix data used in the present embodiment.

The basic size of this screen matrix is 3×3. When it is recorded by binary recording, steps of gradation obtained is not more than 3×3+1=10 but if PWM recording can be made for 0%, 50% and 100% by using PWM, it is possible to obtain (3×3)×2+1=19 steps of gradation.

Assume that the pulse width series with minimum pulse width of 100% and minimum pulse width space of more than 100% is set as the amount required for image recording.

Figure 10A:
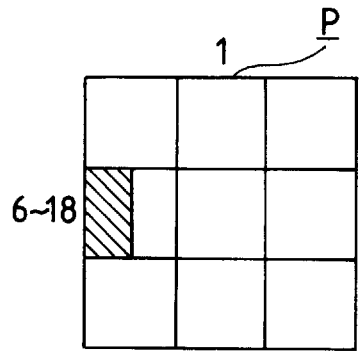
FIGS. 10A to 10F are the drawings to show the relation between input concentration and the screen formed.
Figure 10B:
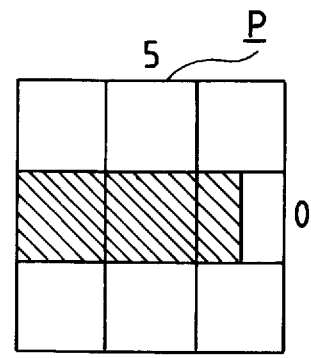
Figure 10C:
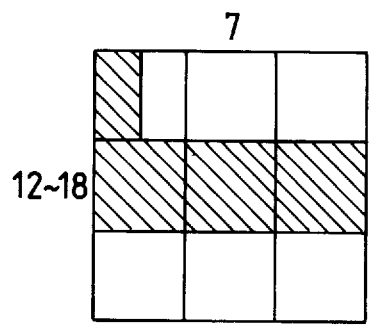
Figure 10D:
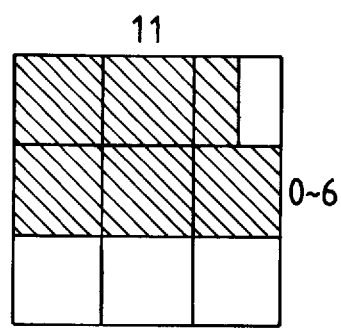
Figure 10E:
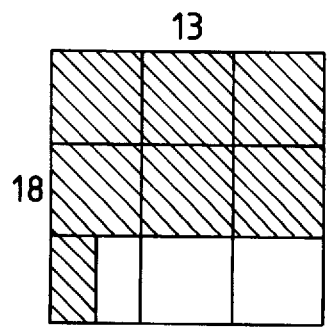
Figure 10F:
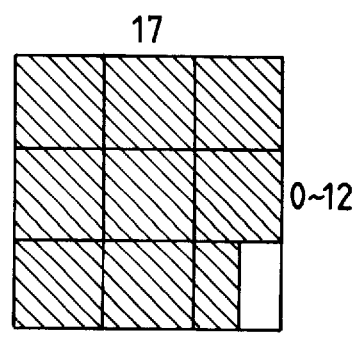

In the screen pattern matrix of FIG. 9, when the data of the pixel is 0, screen is not formed and when it is 1, recording is made as shown in FIG. 10A. When it is 7, recording is made as shown in FIG. 10C, when it is 17 recording is made as shown in FIG. 10F and when it is 18, recording is made in the manner to cover the entire area of the matrix.

FIGS. 10A–10F illustrate the screen data for the case where there is possibility that the screen is formed without satisfying the minimum pulse width and minimum pulse width space. In FIGS. 10A to 10F, the numerals in the upper column denote the pixel data corresponding to the screen as aforesaid and the numerals at left side denote the range of data of the pixel preceding said pixel. When the data are within the data range indicated there, the present pixel is allowed to form the screen with the data as they are. The numerals at the right side indicate the range of data of the pixel next following the present pixel and if the data are within the data range indicated there, the present pixel is allowed to form the screen with the data as they are.

In other words, FIG. 10A is the screen pattern formed when the pixel data is 1 but unless the data of the preceding pixel is over 6, the minimum pulse width series becomes smaller than 100% and this PWM is not allowed. FIG. 10D is the screen pattern when the pixel data is 11 and here unless the data of next following pixel is 0–6, the minimum pulse width space series becomes less than 100% and its PWM is not allowed.

Figure 11:
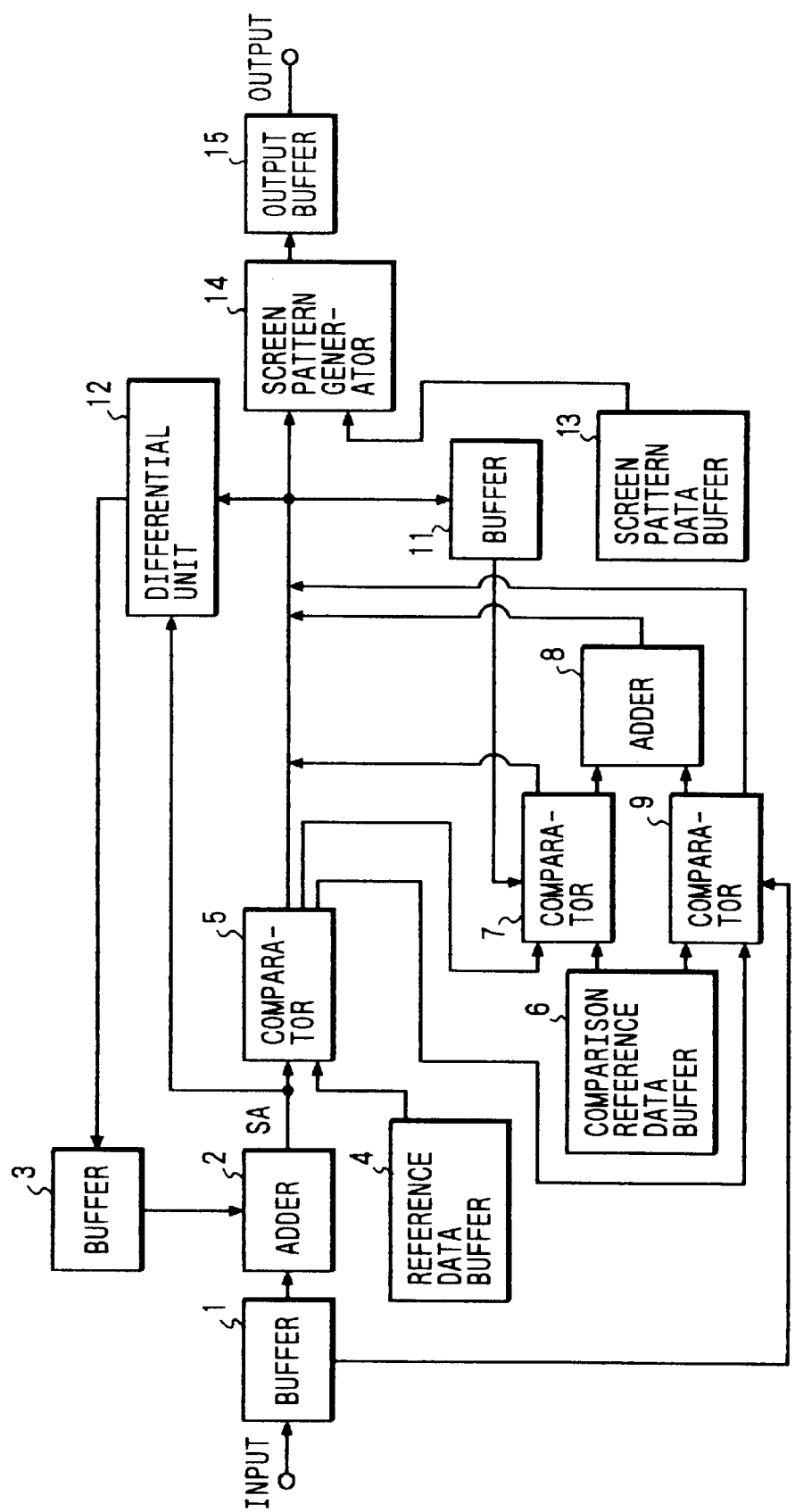
FIG. 11 is the circuit block diagram of the present embodiment.

FIG. 11 is the circuit block diagram for the present embodiment.

The process flow shall be explained in further detail in reference to said drawing.

In FIG. 11, a pixel data is stored in buffer 1 and it is transmitted to adder 2. At this time in buffer 1, the following pixel data stored. At adder 2, a pixel data is added with error data of the preceding pixel held in buffer 3 and becomes data SA. Such data SA is transmitted to comparator 5 and differential unit 12 and at comparator 5, such data SA is compared with the reference data held in reference data buffer 4.

In the reference data buffer 4 are stored the data in the upper column of each drawing indicated in FIGS. 10A–10F namely, the screen (dot) data (1, 7, 13, 5, 11, 17) which has possibility to form screen without satisfying the minimum pulse width and minimum pulse width space.

When data SA differs from reference data (1, 7, 13, 5, 11, 17), data SA is transmitted to screen pattern generator 14, differential unit 12 and buffer 11.

At the screen pattern generator 14, screen pattern is generated by the screen pattern data stored in the screen pattern data buffer 13 using data SA and it is transmitted to output buffer 15. At output buffer 15, the transmitted screen pattern is stored one after another and it is delivered to the output. The output is transmitted to laser oscillator 103 in FIG. 8 and PWM modulation recording is conducted.

In the screen pattern data buffer 13 is stored the screen pattern matrix data indicated in FIG. 9.

When data SA agrees with data (1, 7, 13) among the reference data (1, 7, 13, 5, 11, 17), data SA is transmitted to comparator 7.

At comparator 7, data SA is further compared with the pixel data recorded previously and held in buffer 11 and the comparative reference data held in comparative reference data buffer 6.

At the comparative reference data buffer 6 are stored the data in the data range shown at left side and the data range shown at the right side, corresponding to the data in the upper column of each drawing shown in FIGS. 10A to 10F.

When data SA is 1 and the preceding pixel data is within the range (6 to 18) or when data SA is 7 and preceding pixel data is in the range of (12 to 18) or when data SA is 13 and preceding pixel data is 18, the data SA is transmitted to screen pattern generator 14, differential unit 12 and buffer 11 and thereafter the processing same as described hereinabove is executed.

When the relation between data SA and preceding pixel data is different from the relation stated above, the data SA is transmitted to adder 8 and at adder 8, −1 is added and it is sent to screen pattern generator 14, differential unit 12 and buffer 11 and the processing same as described hereinabove is executed.

When data SA agrees with the date (5, 11, 17) among reference data (1, 7, 13, 5, 11, 17), the data SA is transmitted to comparator 9.

At comparator 9, data SA is compared with the succeeding pixel data held in buffer 1 and the comparative reference data held in comparative reference data buffer 6.

When data SA is 5 and the succeeding pixel data is 0, or when data SA is 11 and succeeding pixel data is within the range of (0 to 6) or when data SA is 17 and succeeding pixel data is in the range of (0 to 12), data SA is transmitted to screen pattern generator 14, differential unit 12 and buffer 11 and the same processing as aforesaid is executed. When the relation between the data SA and the succeeding pixel data is different from the relation stated above, data SA is transmitted to adder 8 and at adder 8, −1 is added and it is transmitted to screen pattern generator 14, differential unit 12 and buffer 11 and thereafter the same processing as aforesaid is executed.

At differential unit 12, the difference between the data SA received from the adder and the data for generating actual screen pattern is detected and such differential data is transmitted to buffer 3.

As aforesaid, according to the present embodiment 4, it is possible to conduct favorable screen pixel recording satisfying the minimum pulse width and minimum pulse width space.

Here the screen pattern matrix data has been explained on the pattern which increases from the left end as shown in FIG. 9 but it is not at all limited thereto but the embodiment is applicable to the so-called fattening type where the pattern increases starting at the center.

The present embodiment gives remarkable effect when applied to flying spot system but it can be of course applicable without the problem to the drum scan system.

[Embodiment 5]

Next the embodiment 5 of the present invention is described in reference to the drawings.

Figures 12, 13A, 13B:
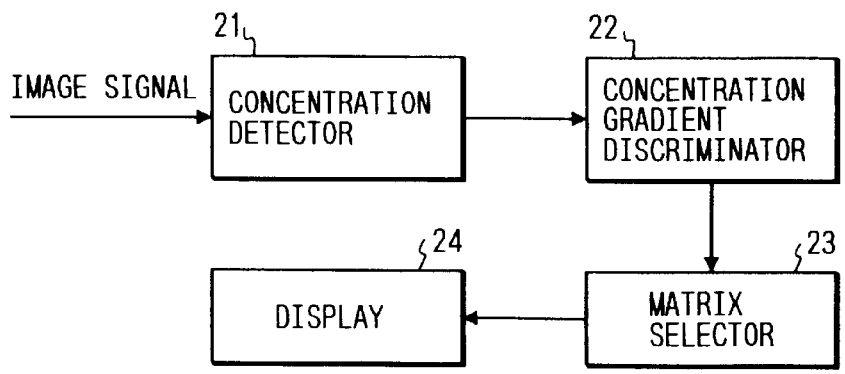
FIG. 12 is the block diagram to show an example of embodiment of the image display apparatus of the present invention.
FIG. 13A is the block diagram of threshold matrix in the partial display area corresponding to one pixel of the image signal.
FIG. 13B is the block diagram of threshold matrix in one display area corresponding to 4 pixels of image signal.
Figure 14A:
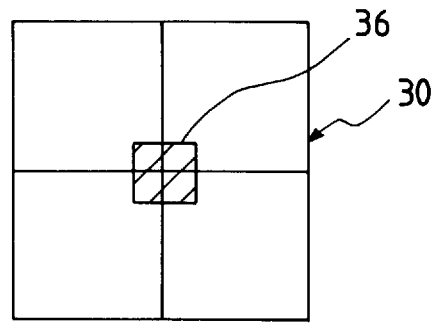
Figure 14B:
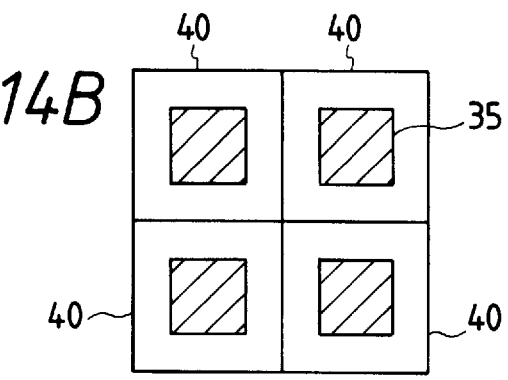
Figure 14C:
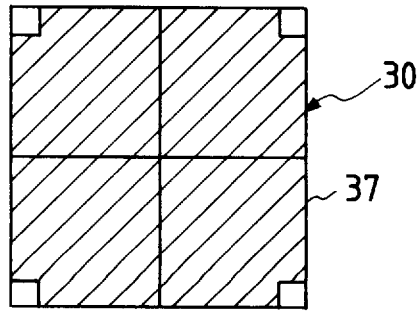

FIG. 12 is the block diagram to indicate the embodiment 5 of the image display apparatus of the invention, 13A is the block diagram of threshold matrix within the partial display area corresponding to one pixel of image signal, FIG. 13B is the block diagram of threshold matrix within one display area corresponding to 4 pixels of image signal, FIG. 14A is the drawing to indicate the state where the blackened display pixels form the dot for low concentration, FIG. 14B is the drawing to show said pixels form the dot for intermediate concentration, FIG. 14C is the drawing to show the state where said pixels form the dot for high concentration and FIG. 15 is the flow diagram to show the performance of the present embodiment.

The image display apparatus of the present embodiment is composed of the publicly known density detector 21 to which the signals corresponding to each pixel of the image are supplied, concentration gradient discriminator 22 which is the concentration gradient discriminating means to compare the concentration of each pixel according to the successive supply of the result of detection by concentration detector 21, matrix selector 23 which is the matrix selection means to select either 4×4 partial display area or 8×8 display area as the matrix and the publicly known displayer 24 on which display pixels are arranged. As the displayer, the flying spot type printer as shown in FIG. 8 is used.

Usually as in the conventional case 16 display pixels 31 which form 4×4 matrix correspond to one pixel of image signal as the partial display area 40 and according to the concentration of pixel signal, display pixels 31 are blackened by the order of the numerals described in the drawing and the aggregation of blackened display pixels 31 form dot 35 as shown in FIG. 14B. When 4 pixels forming 2×2 matrix of image signal are all low concentration or high concentration, these 4 pixels are grouped as one unit and in the corresponding display area 30, display pixels 31 are blackened by the order of the numerals described in FIG. 13B and the blackened pixel form the dot 36 which displays low concentration or dot 37 which displays high concentration. In the display area 30, 64 display pixels 31 form 8×8 matrix.

Next the performance of the embodiment 5 is explained.

Image signal is supplied to concentration detector 21 and after detection of concentration of each pixel, the signals are transmitted to concentration gradient discriminator 22. Here discrimination is made on whether 4 pixels which form 2×2 matrix are all low concentration or high concentration (step 25) and when all pixels are of low concentration or high concentration, display area 30 where display pixels 31 form 8×8 matrix is selected by the matrix selector 23 (step 26) and when concentration gradient exists in each pixel or when all pixels are intermediate concentration partial display area 40 where display pixels 31 form 1×4 matrix (step 27) is selected. Then according to the results of selection, image signal displays or prints out the concentration by the publicly known displayer 24, which is composed of many display areas 30 or partial display area 40 where display pixels 31 are arranged in matrix form.

As the concentration gradient discriminator 22, it is appropriate to use the one which is constructed on the basis of the concept that reference voltage $V_{RB}$ indicating the concentration at the boundary between low concentration and intermediate concentration and reference voltage $V_{RT}$ indicating the concentration at the boundary between intermediate concentration and high concentration are provided and discrimination is made by the comparison means such as comparator to which concentration of said three stages, a given signal from the concentration detector 21 belongs but the embodiment is not limited thereto.

In the present embodiment, explanation has been made on the partial display area 40 where display pixels 31 form 4×1 matrix and the display area 30 where display pixels 31 form 8×8 matrix but the embodiment is not limited to such matrix but it may also be possible to assume that partial display area where display pixels form for instance 6×6 matrix and the display area where the pixels form 18×18 matrix. In this case, 9 pixels of image signal which forms 3×3 matrix corresponds to the display area.

As explained above, in the embodiment 5, apart from the partial display area corresponding to one pixel of image signal, display area corresponding to a group of plural pixels arranged in matrix form is provided and usually dot is formed in the partial display area by blackening the display pixels according to the threshold matrix of dot aggregation type, and when all of the plural number of pixels corresponding to display area are of low concentration or of high concentration, dot is formed by blackening the display pixels in the display area in accordance with the threshold matrix of dot aggregation type and hence it provides such effect that each dot is larger at low concentration time and space between each dot is wider at high concentration time than the case of conventional method and thereby stable image display method and apparatus with preferred reproducibility of concentration are provided.

Hereunder is explained the original plate of process film to which embodiments 1 to 5 may be applied.

Original photosensitive printing plate contains polymeric polymer precursor and photopolymerization initiator in between the support member 53 and peeling film 51 and has the layer 101 which is polymerized by light irradiation (hereinafter called polymerizing layer 52). With the original photosensitive printing plate, polymerized and unpolymerized patterns are formed in the polymerizing layer 52 as the result of image exposure and by peeling the peeling film 51 off the supporting member 53, the so-called "peel apart" can be executed. In other words, by peeling the peeling film 51 off the supporting member 53, unpolymerized part of polymerizing layer 52 is removed together with the peeling film 19 and the supporting member 100 and polymerized part are used as printing plate.

For the polymeric polymer precursor to be contained in the polymerizing layer 52, the compound having at least one reactive vinyl group in the molecule may be used. The reactive vinyl group of such compound may be styrene-based vinyl group, acrylate-based vinyl group, methacrylate-based vinyl group, allylate-based vinyl group, vinyl ether etc. and in addition substituted or non-substituted vinyl group having polymerizing reactivity for example ester-based vinyl group such as vinyl acetate.

The concrete examples of polymeric polymer precursor which satisfies said conditions are as follows:

For example, monovalent monomer such as styrene, methylstyrene, cholorostyrene, bromostyrene, methoxystyrene, dimethylaminostyrene, cyanostyrene, nitrostyrene, hydroxystyrene, aminostyrene, carboxystyrene, acrylic acid, methyl acrylate, ethyl acrylate, cyclohexane acrylate, acrylamide, methacrylic acid, methyl methacrylate, ethyl methacrylate, propyl methacrylate, butyl methacrylate, phenyl methacrylate, cyclohexy methacrylate, vinyl pyridine, N-vinyl pyrolidone, N-vinyl imidazole, 2-vinyl imidazole, N-methyl-2-vinyl imidazole, propyl vinyl ether, butyl vinyl ether, isobutyl vinyl ether, 0-chlorethyl vinyl ether, phenyl vinyl ether, p-methylphenyl vinyl ether, pchlorophenyl vinyl ether; divalent monomer for example divinyl benzene, distyril oxalate, distyril malonate, distyril succinate, distyril glutarate, distyril adipate, distyril maleate, distyril fumarate, distyril 3,8-dimethylglutarate, distyril 2-bromoglutarate, distyril a,a'-dichloroglutarate, distyril terephthalate, di(ethyl acrylate) oxalate, di(methyl ethyl acrylate) oxalate, di(ethyl acrylate) malonate, di(methylethyl acrylate) malonate, di(ethylacrylate) succinate, di(ethylacrylate) glutarate, di(ethylacrylate) adipate, di(ethylacrylate) maleate, di(ethylacrylate) fumarate, di(ethylacrylate) , dimethylglutarate, ethylene diacrylamide, propylene diacrylamide, 1,4-phenylene diacrylamide, 1,4-phenylene bis(oxyethyl acrylate), 1,4-phenylene bis(oxyethyl acrylate), 1,4-phenylene bis (oxymethylethyl acrylate), 1,4-bis(acryloyl oxyethoxy) cyclohexane, 1,4-bis(acryloyl oxymethyl ethoxy) cyclohexane, 1,4-bis(acryloyl oxethoxy carbamoyl) benzene, 1,4-bis(acryloyl oxymethyl ethoxy carbamoyl) benzene, 1,4-bis(acryloyl oxyethoxy carbamoyl) cyclohexame, bis(acryloyl oxyethoxy carbamoyl cyclohexyl) methane, di(ethylmethacrylate) oxalate, di(methylethyl methacrylate) oxalate, di(ethlmethacrylate) malonate, di(methylethyl methacrylate) malonate, di(ethyl methacrylate) succinate, di(methlethyl methacrylate) succinate, di(ethyl methacrylate) gultarate, di(ethyl methacrylate) adipate, di(ethyl methacrylate) maleate, di(ethylmethacrylate) fumarate, di(methylethyl methacrylate) fumarate, di(ethyl methacrylate) f,f'-dimethylglutarate, 1,4-phenylene bis(oxyethyl methacrylate), 1,4-bis(methacryloyl oxyethoxy) cyclohexane acryloyl oxyethoxy ethylvinyl ether; trivalent monomer for example pentaerythritol triacrylate, pentaerythritol tri (hydroxystyrene), triacrylate cyanurate, trimethacrylate cyanurate, 1,1,1-trimethylol propane triacrylate, 1,1,1-trimethylol propantrimethacrylate, tri(ethylacrylate) cyanurate, 1,1,1-trimethylol propane tri(ethyl acrylate), tri (ethylvinyl ether) cyanurate, condensate of 1,1,1-trimethylol propane tri(toluenediisocyanate) and hydroxy ethyl acrylate, condensate of 1,1,1-trimethylol propane tri (hexanediisocyanate) and Phydroxystyrene; tetravalent monomer for example ethylene tetraacrylamide, propylene tetraacrylamide, etc. Alternatively, as aforesaid, more than two kinds of these polymeric polyer precursors may be used.

As the photopolymerization initiator to be contained in the polymer layer 52, carbonyl compound, sulfur compound, halogen compound, Redox type photopolymerization initiator, etc. may be cited.

To be concrete, as the carbonyl compound, diketones for example benzyl, 4,4'-dimethoxy benzyl, diacetyl, camphorquinone; benzophenones for example 4,4'-bis (diethylamino) benzophenone, 4,4'-dimethoxy benzophenone; acetophenones for example acetophenone, 4-mexthoxyacetophenone; benzoylakyl ethers; thioxanthone for example 2-dichlorothioxanthone, 2,4-diethylthioxanthone, thioxanthone-3-carboxylic acid-o-methoxyethyl ester; chalcones and styryl ketones containing dialkylamino group; cumarins such as 3,3'-carbonyl(7-methoxy cumarin), 3,3'-carbonyl bis(7-diethyl amino cumarin) etc.

As sulfur compound, for example dibenzothiazolyl sulfide, decylphenyl sulfide or disulfide may be cited. As halogen compound, for example carbon tetrabromide, quinoline sulfonylchloride, Striazines containing trihalomethyl group, etc. may be cited.

As the Redox type photopolymerization initiator, combination of trivalent ferroion compound (for example ferric ammonium citrate) and peroxide, combination of photoreducing pigment such as riboflavin or methylene blue and reducing agent such as triethanol amino or ascorbic acid may be employed.

In the case of the aforesaid photopolymerization initiators, it is possible to execute efficient photopolymerization by coupling more than two such initiators.

As the combination of such pohotopolymerization initiator, the combination of chalcones, styrilketones and cumarins containing dialkylamine group and S-triazines or camphorquinones containing trihalomethyl group may be cited.

Instead of polymeric polymer precursor and photopolymerization initiator, it is also possible to use thermodeveloping polymer laser which contains photosensitive halogenated silver, organic silver salt and reducing agent in the polymer layer 52. In this case, polymerized and unpolymerized patterns are formed in the polymer layer 52 by heating (thermodeveloping) and polymerization exposure after image exposure.

In the case of thermodeveloping type polymer layer, there is case where, depending on the kind of reducing agent contained, polymerization of exposed part proceeds faster than that of unexposed part and the case vice versa but polymerized and unpolymerized pattern with better contrast is obtained in the latter case.

By selecting certain reducing agent, polymerization of unexposed part proceeds faster than the image exposed part. It is because at the image exposed part, organic silver salt and reducing agent cause oxidation reduction reaction and the oxidized compound produced by such reaction (oxidized reducing agent) has light absorbing property.

It means, at the image exposed part where oxide is produced, light of specific wavelength is absorbed by the oxide and polymerization does not proceed substantially thereafter, while at the unexposed part where oxide is not produced, light is not substantially absorbed and polymerization proceeds. Thus polymerized and unpolymerized patterns are formed in the thermodeveloping type polymer layer.

Halogenated silver produces silver nucleus as the result of image exposure and such silver nucleus becomes the catalyst in the oxidation-reduction reaction of organic silver salt and reducing agent. In other words, latent image is formed by silver nucleus.

For the halogenated silver to be contained in the thermodeveloping type polymer layer, halogenated silvers publicly known in photographic technology, etc. may be used, for example, silver chloride, silver bromide, silver iodide, silver chlorobromide, silver chloroiodide, silver iodobromide, silver chloroiodobromide may be used.

Halogen composition of halogenated silver granules may be uniform or ununiform between at the surface and at the inside. Average grain size of halogenated silver is preferably 0.001 pm to 10 Am and most preferably 0.001 gm to 5 Am.

These agents may be given chemical sensitization or photo-sensitization as conducted normally for photographic emulsion. It means, for chemical sensitization, it is possible to employ sulfur sensitization, precious metal sensitization, reduction sensitization etc. and for photosensitization, it is possible to use photosensitive pigment such as cyanine pigment, melocyanine pigment.

For organic silver salt, silver salt aliphatic carboxylic acid, aromatic carboxylic acid, thiocarbonyl group compound having mercapto group or a-hydrogen or compound containing imino group may be used.

As the aliphatic carboxylic acid, such acids are available as acetic acide, butyric acid, succinic acid, sebacic acid, adipic acid, oleic acid, linolic acid, linolenic acid, tataric acid, palmitic acid, steraric acid, behenic acid, camphoric acid etc. but generally speaking, the fewer the carbon number, the more stable is silver salt, hence the compound having appropriate carbon number is preferred.

As the aromatic carboxylic acid, benzoic acid derivative, quinolinic acid derivative, naphthalene carboxylic acid derivative, salicilic acid derivative, gallic acid, tannic acid, phthalic acid, phenyl acetic acid derivative, pyromellitic acid etc. are available.

As the compound containing thiocarbonyl group having mercapto or a-hydrogen, 3-methylmercapto-4-phenyl-1,2,4-triazol, 2-mercaptobenzoimidazol, 2-mercapto-5-aminothiazol, 2-mercapto-benzothiazol, s-alkylthioglycol acid (carbon number of alkyl group is 12 to 22), dithio carboxylic acids such as dithio acetic acid, thioamides such as thiostearoamide, 5-carboxyl-1-methyl-2-phenyl-4-thiopyridine, mercapto compound described in U.S. Pat. No. 4,123,274 such as mercaptotriazine, 2-mercaptobenzooxazol, mercaptooxaziozol or 3-amino-5-benzylthio-1,2,4-triazol may be cited.

As the compound having imino group, typical examples are benzotriazol or its derivative described in Japanese Patent Publications No. 4430270 and No. 45-18416, for example benzotriazol, alkyl-substituted benzotriazols such as methylbenzotriazol, haolgen-substituted benzotriazols such as 5-chloro-benzotriazols, carboimidobenzotriazols such as butylcarboimidobenzotriazol, nitrobenzotriazol described in Japanese Laid-open Patent Application No. 58-118639, sulfobenzotriazol carboxybenzotriazol or its salt or hydroxybenzotriazol etc. described in Japanese Laid-Open Patent Application No. 58-115638, 1,2,4-triazol or 1-H-tetrazol, carbazol, succharin, imidazol and its derivative etc. described in U.S. Pat. No. 4,220,709.

As reducing agent, the compound which produces silver by oxidation reduction reaction with organic silver salts under heating using silver latent image on the photosensitive halogenated silver as catalyst and absorbs light with wavelength in the range of absorption wavelength of photopolymerization initiator in the photopolymerization layer by the produced silver image and thus acts to reduce transmitting light quantity or the compound having the effect that the oxide produced by oxidation-reduction reaction acts to absorb light with wavelength in the range of absorption wavelength of photopolymerization initiator.

As the reducing agent which may be used in the present invention, the reducing agent described in "Shashin Kogaku No Kiso - Non-silver salt edition, P250" or primary color development main agent, secondary color development main agent may be used. For such agent, for example, phenols, hydroquinones, cathechols, p-aminophenols, psubstituted aminophenols, p-phenylene diamines, 3-pyrazolidones and in addition resolcines, pyrogallols, o-aminophenols, m-aminophenols, mpheynylene diamines, 5-pyrazolenes, alkylphenols, alkoxyphenols, naphthols, aminonaphthols, naphthalene diols, alkoxynaphthols, hydrazines, hydrazones, hydroxycumarones.hydroxycumaranes, sulfonamidophenols, aminonaphthols, ascorbic acids, hydroxyindanes, bisphenols, orthobisphenols etc. may be used.

It is also possible to use leucobase obtained by reduction of pigment as reducing agent. It is also possible to use two or more kinds of the aforesaid reducing agents in combination. When the secondary color development main agent is used, it is preferred to co-use the coupler which reacts with these oxidation products and produce light absorbing a compound.

As the concrete examples of reducing agent, for example, hydroquinone, hydroquinone monomethylether, 2,4-dimethyl-6-t-butylphenol, cathechol, dichlorocathechol, 2-methylcathechol, methyl gallate, ethyl gallate, propyl gallate, oaminophenol, 3,5-dimethyl-2-aminophenol, paminophenol, p-amino-o-methylphenol, m-dimethylaminophenol, m-diethylaminophenol, s,6-dicyclohexyl-4-methylphenol, 1-naphthol, 2-methyl-lnaphthol, 2,4-dichloro-1-naphthol, 1,1-di-2-naphthol, 2,2-methylene bis(4-methyl-6-tbutylphenol), 2,2-methylene bis (4-ethyl-6-tbutylphenol), 2,2-butylidene bis (4-methyl-6-tbutylphenol), 4,4-butylidene bis(3-methyl-6-t-3,6-butylphenol), 4,4-methylene bis(2,6-di-tbutylphenol), 1,1,3-tris(2-methyl-4-hydroxy-5-tbutylphenol) butane, 4,4-thiobis (3-methyl-6-tbutylphenol), 2,4-bis(ethylthio)-6-(4-hydroxy-3,5-di-t-butylanilino)-1,3,5-triazine, 2,4-bis(octylthio)-6-(4- hydroxy-3,5-di-t-butylanilino) 1,3,5-triazine, 2,6-dichloro-4-benzene sulfonamidophenol, 2-chloro-4-benzensulfonamidophenol, 2,6-dibromo-4-benzensulfonamidophenol, thioindoxyl, indoxyl, 1,3-dimethyl pyrogallol, 1-methoxynaphthol, 4-ethoxynaphthol, 2-cyanoacetyl cumarone, N,N-dimethylphenylene diamine, N,N'-diethylphenylene diamine, N',N'-diethyl-3-methylphenylene diamine etc. may be cited.

As the coupler to be used when secondary developing main agent (for example phenylene diamine-based or p-aminophenol-based compound) is used, for example, 1-hydroxy-N-butyl-2-naphthamide, benzoyl acetone, benzoyl acetoanilide, omethoxybenzoylaceto-o-methoxyanilide, dibenzoylmethane, 2-chloro-1-naphthol, 2,6-dibromo-1,5-naphthalene diol, 3-methyl-1-phenyl pyrozolone may be cited.

Light absorbing oxides are the compound which may belong to or do not belong to pigment but can substantially reduce sensitivity of photopolymerization initiator. For instance when absorption in ultra-violet range is utilized, absorption visible light range is not a problem.

As the concrete examples of the combination of light absorbing oxide and photopolymerization initiator, when, for example, 4,4'-methylene bis(2-methyl-6-t-butylphenol), 4,4-methylene bis(2,6-di-t-butylphenol) etc. is used as reducing agent, photopolymerization initiator having sensitivity at 380 to 390 nm, for example, 2-chlorothioxanthone, 2-methylthioxanthone, 2,4-dimethylthioxanthone, 2,4,6-trimethylbenzol diphenylphosphine oxide, benzyl may be used.

When cyanic pigment is formed by 2,6-di-tbutyl-4-benzylphenol, 1-(3,5-di-t-butyl-4-hydroxyphenyl)-1-phenylethane etc. or secondary color development main agent, the photopolymerization initiator having sensitivity at 300 to 370 nm in addition to visible light range, for example, 1-phenyl-2-hydroxy-2-methylpropane-1'-on, 1-hydroxycyclohexylphenylketone, benzoine dimethylether, benzophenone, 4-benzoyl-4'-methyldiphenylsulfide etc. may be used.

Furthermore, by applying image exposure and thermal development to aforesaid silver salt film containing photosensitive halogenated silver, organic silver salt and reducing agent, it is possible to form blackened image at the part given image exposure.

As explained above, according to the present invention, image recording is possible without reducing the size of recording are beyond necessity and such recording method is preferred particularly in the manufacture of printing master plate.

Furthermore, when there is restriction on the minimum recording size, it is possible to provide an image recording apparatus which enables to preserve concentration and reproduce with stability the image of intermediate gradation by propagating error values.

The present invention may be modified and applied in diverse manner within the scope of the claims not being limited to the aforesaid plurality of embodiments.

What is claimed is:

1. A method of processing image data preparatory to recording the image data on a printing plate, the method comprising the steps of:
   inputting image data of each pixel of an image;
   modulating the image data using pulse width modulation; and
   controlling a minimum pulse width of the pulse width modulated image data for a target pixel to an extent beyond where a dot can be formed on the printing plate in consideration of the image data of a pixel adjacent to the target pixel.

2. A method according to claim 1, wherein in said controlling step, the minimum pulse width of the modulated data is limited to a predetermined width.

3. A method according to claim 1, wherein in said controlling step, a minimum pulse width interval of the modulated image data is limited to a predetermined width.

4. A method according to claim 1, wherein said controlling step further comprises comparing a value obtained based on the image data of the target pixel with the image data of the pixel adjacent to the target pixel and controlling the pulse width of the target pixel in accordance with a comparison result.

5. An image processing apparatus comprising:
   a) input means for inputting image data of each pixel of an image; and
   b) modulation means for pulse-width modulating the image data of a target input by said input means,
   wherein said modulation means includes control means for controlling the pulse width of the target pixel in consideration of the image data of a pixel adjacent to the target pixel, such that a pulse width interval between the adjacent pixels has at least a minimum predetermined width.

6. An apparatus according to claim 5, further comprising image formation means for forming an image on a recording medium, on the basis of pulse-width modulated data generated by said modulation means.

7. An apparatus according to claim 6, wherein said image formation means is a laser beam printer.

8. An apparatus according to claim 6, wherein said image formation means forms the image on the recording medium by generating a beam on the basis of the pulse-width modulated data.

9. An apparatus according to claim 6, wherein said image formation means forms the image by using a photosensitive member formed by utilizing an organic silver salt.

10. An apparatus according to claim 5, wherein said control means controls a minimum pulse width of the pulse-width modulated data to the predetermined width.

11. An apparatus according to claim 5, wherein said control means includes comparison means for comparing a value obtained based on the image data of the target pixel with the image data of the pixel adjacent to the target pixel, and
   said control means controls the pulse width of the target pixel in accordance with a comparison result of said comparison means.

12. An apparatus according to claim 5, wherein said control means controls the pulse width by distributing the image data of a target pixel to an adjacent pixel.

13. An image processing apparatus comprising:
   a) input means for inputting image data of each pixel of an image; and
   b) modulation means for pulse-width modulating the image data of a target input by said input means,
   wherein said modulation means includes control means for controlling a minimum pulse width of the target pixel in accordance with the image data of a pixel adjacent to the target pixel.

14. An apparatus according to claim 13, further comprising image formation means for forming an image on a recording medium on the basis of pulse-width modulated data generated by said modulation means.

15. An apparatus according to claim 14, wherein said image formation means is a laser beam printer.

16. An apparatus according to claim 13, wherein said control means includes comparison means for comparing a value obtained based on the image data of the target pixel with the image data of the pixel adjacent to the target pixel, and wherein said control means cotrols the minimum pulse width of the target pixel in accordance with a comparison result of said comparison means.

17. An image processing apparatus for processing image data preparatory to recording the image data on a printing plate, comprising:

input means for inputting image data of each pixel of an image;

modulation means for modulating the image data using pulse width modulation; and control means for controlling a minimum pulse width of the pulse width modulated image data for a target pixel to an extent beyond where a dot can be formed on the printing plate, in consideration of the image data of a pixel adjacent to the target pixel.

18. An image processing apparatus according to claim 17, wherein said control means limits the minimum pulse width of the modulated data to a predetermined width.

19. An image processing apparatus according to claim 17, wherein said control means limits a minimum pulse width interval of the modulated image data to a predetermined width.

20. An image processing apparatus according to claim 17, wherein said control means further comprises comparison means for comparing a value obtained based on the image data of the target pixel with the image data of the pixel adjacent to the target pixel and said control means controls the pulse width of the target pixel in accordance with a comparison result of said comparison means.

21. An image processing method comprising:

a) an input step of inputting image data of each pixel of an image; and b) a modulation step of pulse-width modulating the image data of a target input in said input step, wherein said modulation step includes a control step of controlling the pulse width of the target pixel in consideration of the image data of a pixel adjacent to the target pixel, such that a pulse width interval between the adjacent pixels has at least a minimum predetermined width.

22. An image processing method comprising:

a) an input step of inputting image data of each pixel of an image; and b) a modulation step of pulse-width modulating the image data of a target input by said input means, wherein said modulation step includes a control step of controlling a minimum pulse width of the target pixel in accordance with the image data of a pixel adjacent to the target pixel.

* * * * *

UNITED STATES PATENT AND TRADEMARK OFFICE
CERTIFICATE OF CORRECTION

PATENT NO. : 5,864,406

DATED : January 26, 1999

INVENTOR(S): KAZUO ISAKA, ET AL.

It is certified that error appears in the above-identified patent and that said Letters Patent is hereby corrected as shown below:

COVER PAGE [56] References Cited, OTHER PUBLICATIONS,
Line 8, "COm-" should read --Com- --.

COLUMN 8,
Line 55, "(2,)" should read --(2, 1)--.

COLUMN 9,
Line 2, "$_t0/3$" should read --$t_0/3$--.

COLUMN 11,
Line 8, "processing same" should read --same processing--; and
Line 14, "processing same" should read --same processing--.

COLUMN 13,
Line 49, "0-chlorethyl" should read --$\beta$-chlorethyl--;
Line 51, "pchlorophenyl" should read --p-chlorophenyl--;
Line 54, "3,8-" should read --$\beta$, $\beta$- --; and
Line 61, "di(ethylacrylate), dimethylglutarate," should read --di(ethylacrylate) $\beta$, $\beta$-dimethylglutarate,--.

UNITED STATES PATENT AND TRADEMARK OFFICE
CERTIFICATE OF CORRECTION

PATENT NO. : 5,864,406

DATED : January 26, 1999

INVENTOR(S) : KAZUO ISAKA, ET AL.

It is certified that error appears in the above-identified patent and that said Letters Patent is hereby corrected as shown below:

<u>COLUMN 14</u>,
Line 11, "f,f'-" should read --$\beta, \beta'$- --; and
Line 38, "acid-o-" should read --acid-$\beta$- --.

<u>COLUMN 15</u>,
Line 4, "is" should read --is a--; and
Line 37, "pm" should read --$\mu$m--, "Am" (both occurences) should read --$\mu$m--, "gm" should read --$\mu$m--.

Signed and Sealed this

Twenty-fourth Day of August, 1999

Q. TODD DICKINSON

*Attest:*

*Attesting Officer*       *Acting Commissioner of Patents and Trademarks*